Feb. 25, 1941.                  E. H. PIRON                    2,233,110
                        SPRING AND METHOD OF MAKING IT
                             Filed May 27, 1938
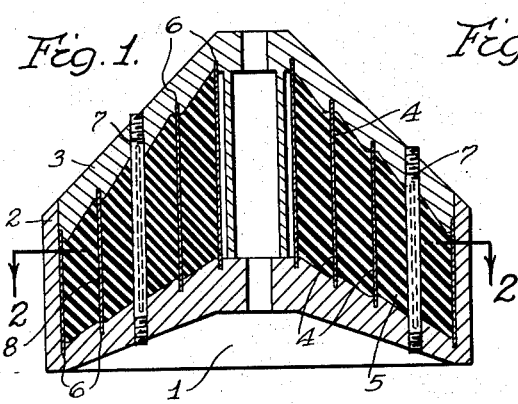
Fig. 1.
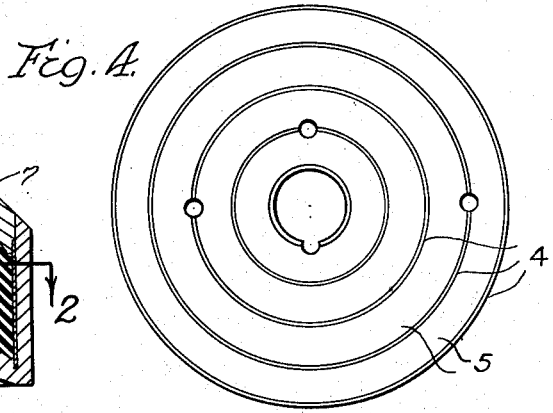
Fig. 4.
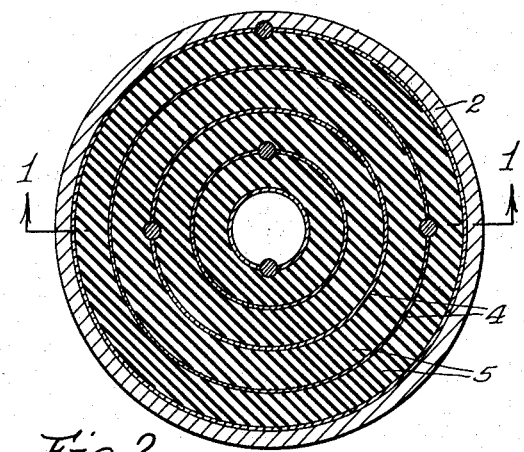
Fig. 2.
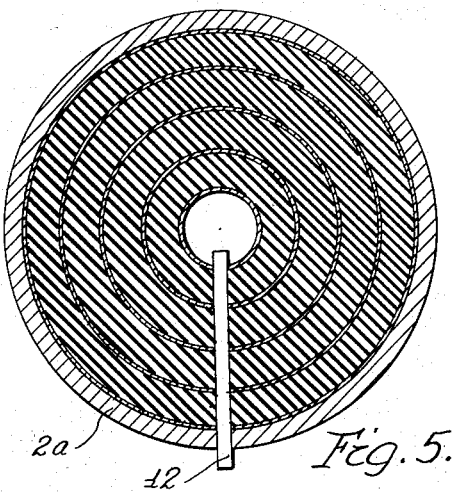
Fig. 5.
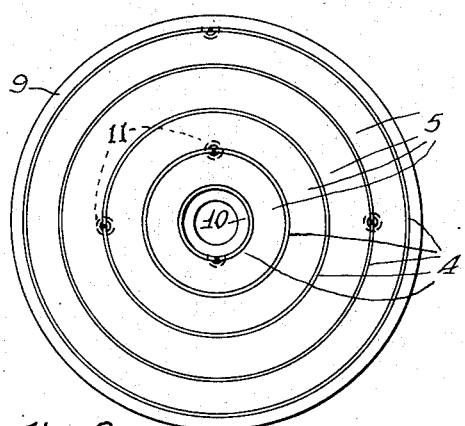
Fig. 3.
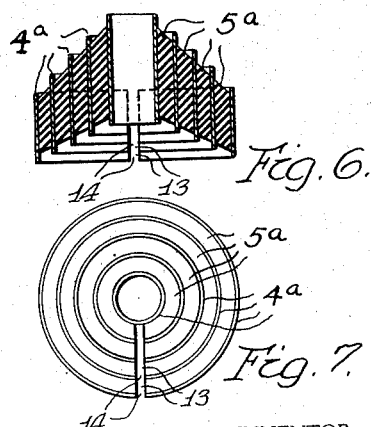
Fig. 6.
Fig. 7.
INVENTOR.
Emil H. Piron
BY 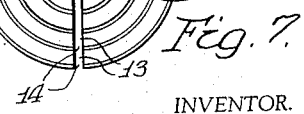
ATTORNEY.

Patented Feb. 25, 1941

2,233,110

UNITED STATES PATENT OFFICE 2,233,110

SPRING AND METHOD OF MAKING IT

Emil H. Piron, New York, N. Y., assignor to Transit Research Corporation, a corporation of New York Application May 27, 1938, Serial No. 210,313

19 Claims. (Cl. 267—63)

This invention relates to elastic springs made of one or several masses of elastic material such as rubber or the like surface bonded to stiff parts some of which are load imposing and load receiving members usually made of metal. The more usual form is where the stiff or metallic parts are concentric and cylindrical in shape and are separated from adjacent parts by elastic material which offers resistance to relative movement of the metal parts in shear or in torsion and in compression.

The principal object of this invention is to provide an improved spring which is more economical to fabricate together with an improved method of making this spring.

More particularly it is the object to provide a spring composed of alternate cylinders of metal and elastic material, the metallic cylinders being capable of expanding or shrinking their diameter under radial forces to permit compression of the elastic material between them.

A further object is to provide a spring as above described which will have improved stiffness against relative tilting of the metallic parts, such movements being ordinarily undesirable in a springing system.

Specifically it is an object to provide a spring, as above described, in which the metallic parts are each split parallel to their axis, the split or slot being of material width so as to permit expanding of the cylinder by widening of the slot or to permit contraction of the cylinder by narrowing of the slot. To make this possible yet prevent excessive local stress in the elastic material in the immediate vicinity of the split, air spaces are provided in the rubber along said slots.

Other objects and advantages will become more fully apparent as reference is had to the accompanying drawing wherein my invention is illustrated, and in which Fig. 1 is a longitudinal diametric section through a mold in which my improved spring is being made, taken along the line 1—1 of Fig. 2, Fig. 2 is a horizontal section taken along the line 2—2 of Fig. 1, Fig. 3 is a top or bottom plan view of a complete spring in a retainer, Fig. 4 is a top or bottom plan view of a modified form of spring, Fig. 5 is a view similar to Fig. 2 showing a further modified form of spring in the process of manufacture, Fig. 6 is a longitudinal diametric view of the finished spring of Fig. 5, and Fig. 7 is a top or bottom plan view of the spring of Fig. 6.

More particularly 1 indicates a mold which may be constructed conveniently of two parts 2 and 3 which, when assembled, form a cavity having two concentric cylindrical or substantially cylindrical peripheries between which my improved spring is made.

The mold is filled with spring material composed of opposite cylindrical layers of metal 4 and rubber compound 5, or equivalent material, to be vulcanized and surface bonded thereto, the metallic layers 4 extending outwardly beyond the rubber compound for extension into grooves 6 formed into the two mold parts 2 and 3. The metallic layers each have a longitudinal section omitted which is to say that they are each longitudinally slotted, and the rubber adjacent the slot on each side thereof is forced away therefrom by pins 7 which are inserted between the edges of each slot before the mold is assembled on the spring materials. The slots and pins of one layer are preferably peripherally offset from those of adjacent layers to increase the stiffness of the spring against tilting. The mold is then subjected to heating until the rubber is vulcanized and cured to the metal layers whereupon the spring is removed from the mold and the pins removed from their positions in the spring. The spring is subjected to radial compression when assembled for operation, the assembly consisting of a load imposing and a load receiving member either of which may be the internal or external member, the numeral 10 here designating the external member and the numeral 9 the internal member. The members 9 and 10 are in the form of cylinders and in order to maintain radial compression on the spring the inside diameter of the member 9 may be smaller than the outside diameter of the spring as it comes from the mold so that there must be a reduction in the circumference of each metallic and rubber layer for insertion into the member 9, thus reducing the width of the slot in each metallic layer together with the air gap in the rubber adjacent each slot; or the inside member 10 may be larger in outside diameter than the smallest metallic layer 5 so that upon insertion therein all layers will be radially expanded thus widening the slots in the metallic layers and causing distortion of the shape of the air spaces adjacent the slots. In the event that the direction of expansion is known, the slot of the inside or of the outside metallic layer need not be provided, Fig. 4 illustrating a spring in which it is contemplated that the compression will always be imposed outwardly and hence the outside metallic layer is a continuous cylinder.

In Fig. 3 the slot has been substantially reduced. The dotted lines 11 indicate the size of the original slots and air gaps. This figure illustrates the preferred form since the spring will adjust itself to commercial tolerances of the member it is expected to fit even though the direction of the imposition of compression is known before manufacture. The inside and outside layers 4 are both slotted.

In Figs. 5, 6 and 7 a spring is illustrated in which the pins 7 have been replaced by a single plate 12 which forms a slot 13 through all rubber layers 5a and which passes progressively through the slots 14 of the metallic layers 4a. This plate 12 is interposed as the materials are being inserted in the mold 2a. After vulcanizing and curing, the plate is removed and the spring is ready for assembly with load imposing and load receiving members in the manner previously described.

This spring, also, may be made with the inner or outer metallic layer solid for the purposes hereinbefore described, Figs. 6 and 7 illustrating the inner layer as being a complete cylinder.

It will be realized that when compression is imposed the layers may contract or expand uniformly into cylinders of different sizes or they may assume a somewhat oval or otherwise out-of-round shape. In order to correct for an out-of-round condition the mold may be made out-of-round, if desired. The stiffness of metal has considerable bearing on the exact technique to be followed.

In all forms, the metallic cylinders preferably, but not necessarily, have greater length than the adjacent elastic cylinders.

What I claim is:

1. A spring comprising a multiplicity of alternate layers of stiff material and elastic material, said layers of stiff material which are disposed between the elastic material being of substantially cylindrical form with a normally open single slot extending from top to bottom thereof whereby said layers are radially expansible and contractible to equalize compression throughout the multiple elastic layers.

2. A spring comprising alternate substantially cylindrical layers of rubber or its equivalent and metal, some of said layers of metal being of substantially cylindrical form with a portion of the circumference thereof removed whereby they may expand or contract across any diameter in the presence of unequal compression conditions in the elastic layers thereby to enable equalization of compression in the several elastic layers.

3. A spring comprising alternate substantially cylindrical layers of rubber or its equivalent and stiff material, at least some of said layers of stiff material being slotted from top to bottom forming two edges movable toward and away from each other under inwardly and outwardly directed radial forces, respectively, resulting from unequal compression of rubber layers adjacent thereto to equalize compression therein, the layers of rubber being recessed adjacent said edges thereby preventing overstressing of said rubber between said edges when said stiff layers are compressed to close or to reduce the width of said slot.

4. A spring comprising alternate cylindrical layers of stiff material and elastic material surface bonded together, said layers of stiff material being of original cylindrical shape and slotted parallel to the axis thereof, and means imposing substantial radial compression on all said layers in final assembly, the size of the slots in said layers of stiff material being adapted to change in the presence of unequal compression of different elastic layers to equalize the compression throughout the several elastic layers.

5. A spring composed of alternate substantially cylindrical layers of stiff and elastic material, said layers of stiff material each having a single slot from top to bottom, said layers of elastic material each having a frusto-conical shape at its top and together forming a composite substantially frusto-conical exterior shape for the top of the spring, said stiff material being expansible and contractible in the presence of unequal radial compression in the elastic layers to cause equalization of radial compression in the elastic layers.

6. A spring composed of alternate substantially cylindrical layers of stiff and elastic material, said layers of stiff material each having a single slot from top to bottom, each slot being normally open whereby said stiff material may expand and contract radially, said layers of elastic material each having a frusto-conical shape at its bottom and together forming a composite substantially frusto-conical shape for the bottom of the spring.

7. A spring composed of alternate substantially cylindrical layers of stiff and elastic material, said layers of stiff material each having a single slot from top to bottom, each slot being normally open whereby said stiff material may expand and contract radially, said layers of elastic material each having a frusto-conical shape at its top and together forming a composite substantially frusto-conical exterior shape for the top of the spring, said layers of elastic material also having a frusto-conical shape at its bottom and together forming a composite substantially frusto-conical shape for the bottom of the spring.

8. The combination as set forth in claim 7 wherein the inclination of the top and bottom are substantially different.

9. A spring composed of alternate substantially cylindrical layers of stiff and elastic material, said layers of stiff material being slotted from top to bottom, each slot being normally open whereby said stiff material may expand and contract radially, and said layers of stiff material being progressively offset with respect to each other longitudinally thereof, said layers of elastic material having inclined exposed surfaces to accommodate themselves to the positions of said stiff layers.

10. A spring composed of alternate substantially cylindrical layers of stiff and elastic material, said layers of stiff material being slotted from top to bottom, each slot being normally open whereby said stiff material may expand and contract radially, and extending substantially beyond said layers of elastic material.

11. A spring composed of alternate substantially cylindrical layers of stiff and elastic material, said layers of stiff material being slotted from top to bottom, each slot being normally open whereby said stiff material may expand and contract radially, and of substantially greater length than said layers of elastic material whereby they project substantially beyond said layers of elastic material at both ends thereof.

12. A spring composed of alternate cylindrical layers of stiff and elastic material having a plurality of openings extending longitudinally therethrough, said openings being formed by slots in the stiff material and grooves in the elastic material parallel to and in register with said slots.

13. A spring composed of alternate layers of stiff and elastic material, each of said layers being cylindrical and interrupted in its circumference whereby each may be contracted and expanded.

14. A spring composed of alternate substantially cylindrical layers of stiff and elastic material, the stiff cylindrical layers each having a single normally open radial slot interrupting the cylindrical form of each thereof, and the elastic material being grooved adjacent said slots and out of contact with the edges thereof.

15. A spring composed of alternate substantially cylindrical layers of stiff and elastic material, each of said layers being radially slotted with a single normally open radial slot and with all slots thereof aligned.

16. A spring composed of alternate substantially cylindrical layers of stiff and elastic material, at least one of the boundary layers thereof being continuous, the remainder of said layers being circumferentially interrupted.

17. A spring composed of alternate substantially cylindrical layers of stiff and elastic material, the inside layer thereof being continuous, the remainder of said layers being radially slotted from top to bottom.

18. The method of making a spring which consists in slotting a plurality of metallic cylinders of progressively increasing diameters, in arranging said cylinders concentrically, in placing spacing means in the slots of the cylinders, in interposing elastic material between said cylinders, in vulcanizing said elastic material to said cylinders, and in removing the means which hold said edges in spaced relation.

19. The method of making a spring which consists in slotting a plurality of metallic cylinders of progressively increasing diameters, in arranging said cylinders concentrically, in interposing elastic material between said cylinders, in inserting spacer means of greater thickness than the thickness of said metallic cylinders in the slots, in vulcanizing the elastic material while surface-bonding it to said metallic cylinders, and in removing said spacer means.

EMIL H. PIRON.